United States Patent
Donzis et al.

(10) Patent No.: US 12,531,936 B2
(45) Date of Patent: *Jan. 20, 2026

(54) SYSTEM AND METHOD FOR PROVIDING REDIRECTIONS

(71) Applicant: PERFTECH, INC., San Antonio, TX (US)

(72) Inventors: Lewis T. Donzis, San Antonio, TX (US); Henry M. Donzis, San Antonio, TX (US); Peter W. Baron, San Antonio, TX (US); John A. Murphy, San Antonio, TX (US)

(73) Assignee: PERFTECH, INC., San Antonio, TX (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/444,708

(22) Filed: Feb. 18, 2024

(65) Prior Publication Data

US 2024/0195884 A1  Jun. 13, 2024

Related U.S. Application Data

(63) Continuation of application No. 17/879,739, filed on Aug. 2, 2022, now Pat. No. 11,997,180, which is a continuation of application No. 16/842,569, filed on Apr. 7, 2020, now Pat. No. 11,405,478, which is a continuation of application No. 15/943,169, filed on Apr. 2, 2018, now Pat. No. 10,616,360, which is a
(Continued)

(51) Int. Cl.
*H04L 67/563* (2022.01)
*G06F 16/955* (2019.01)
*G06Q 10/06* (2023.01)
*H04L 69/163* (2022.01)

(52) U.S. Cl.
CPC .......... *H04L 67/563* (2022.05); *H04L 69/163* (2013.01); *G06F 16/9566* (2019.01); *G06Q 10/06* (2013.01)

(58) Field of Classification Search
CPC ................. H04L 67/563; H04L 69/163; G06F 15/955; G06F 15/9566; G06Q 10/06
USPC ....................................................... 709/224
See application file for complete search history.

(56) References Cited

U.S. PATENT DOCUMENTS 6,415,323 B1 * 7/2002 McCanne ........... H04L 67/1001
709/224
6,760,746 B1 * 7/2004 Schneider ............... H04L 67/60
709/217
(Continued)

OTHER PUBLICATIONS

Feldmann; "Bi-layer tracing of HTTP and TCP/IP"; Computer networks; Jun. 30, 2000; 33(1); 321-35.
(Continued)

*Primary Examiner* — James N Fiorillo

(57) ABSTRACT

A redirection of a URL page request may be performed by monitoring an upstream path from a subscriber to the internet through an ISP. When a URL page request is detected from a subscriber for whom a redirection is required, a redirection device generates a single TCP packet response that mimics a response from the intended destination server. The single TCP packet includes a set FIN bit that closes any active session with the destination server to prevent the subscriber from accepting packets from the destination server.

20 Claims, 3 Drawing Sheets

Related U.S. Application Data continuation of application No. 13/211,406, filed on Aug. 17, 2011, now Pat. No. 9,936,037.

(56) References Cited

U.S. PATENT DOCUMENTS

| | | | | |
|---|---|---|---|---|
| 6,799,214 B1* | 9/2004 | Li | ............ | H04L 67/101 709/219 |
| 7,328,266 B2* | 2/2008 | Schmidt | ............ | H04L 67/563 709/227 |
| 8,108,524 B2* | 1/2012 | Donzis | ............ | H04L 45/745 709/227 |
| 8,161,284 B1* | 4/2012 | Schmidt | ............ | H04L 51/224 713/168 |
| 10,402,897 B1* | 9/2019 | Czyzewski | ............ | G06Q 40/00 |
| 10,601,841 B2* | 3/2020 | Schmidt | ............ | H04L 67/535 |
| 11,669,828 B1* | 6/2023 | Kurani | ............ | G06Q 20/3672 705/41 |
| 2002/0038350 A1* | 3/2002 | Lambert | ............ | G06Q 30/02 707/E17.119 |
| 2002/0116472 A1* | 8/2002 | Kalish | ............ | H04L 67/04 709/218 |
| 2003/0126198 A1* | 7/2003 | Tenereillo | ............ | H04L 67/1021 709/227 |
| 2003/0149787 A1* | 8/2003 | Mangan | ............ | H04L 45/00 709/249 |
| 2003/0182420 A1* | 9/2003 | Jones | ............ | H04L 63/0245 709/224 |
| 2004/0107261 A1* | 6/2004 | Donzis | ............ | H04L 45/745 709/225 |
| 2004/0230695 A1* | 11/2004 | Anschutz | ............ | H04L 47/6215 370/412 |
| 2005/0105513 A1* | 5/2005 | Sullivan | ............ | H04L 69/329 370/352 |
| 2006/0015573 A1* | 1/2006 | Hurst-Hiller | ............ | G06F 16/9566 707/E17.115 |
| 2007/0244987 A1* | 10/2007 | Pedersen | ............ | H04L 67/568 709/217 |
| 2008/0080508 A1* | 4/2008 | Das | ............ | H04L 45/00 370/392 |
| 2010/0024032 A1* | 1/2010 | Britton | ............ | G06Q 30/02 709/224 |
| 2010/0242106 A1* | 9/2010 | Harris | ............ | H04L 63/08 709/224 |
| 2010/0333129 A1* | 12/2010 | Alhadeff | ............ | G06Q 30/02 725/27 |
| 2013/0054802 A1* | 2/2013 | Donzis | ............ | G06F 16/9566 709/225 |
| 2013/0124678 A1* | 5/2013 | Yang | ............ | H04L 67/04 709/217 |
| 2013/0227078 A1* | 8/2013 | Wei | ............ | H04L 67/02 709/224 |
| 2014/0330941 A1* | 11/2014 | Schmidt | ............ | H04L 67/564 709/219 |
| 2024/0195884 A1* | 6/2024 | Donzis | ............ | H04L 67/563 |

OTHER PUBLICATIONS

Kayssi et al.; "FPGA-based Internet Protocol Firewall Chip"; Electronics Circuits and Systems; 2000 ICES 2000; The 7th IEEE International Conference; vol. 1; IEEE; 2000.

* cited by examiner

SYSTEM AND METHOD FOR PROVIDING REDIRECTIONS

FIELD OF THE INVENTION

This disclosure relates to providing bulletin services and notifications to subscribers of an internet service provider (ISP).

BACKGROUND OF THE INVENTION

In the Assignee's earlier patent applications, U.S. Ser. No. 10/023,674 and U.S. Ser. No. 10/623,893, the entire contents of which are explicitly incorporated herein by reference, the present Assignee described networks in which communications such as bulletin services could be provided from an ISP to a subscriber of the ISP. In the referenced applications, a redirection device was placed in the path of upstream traffic from the subscriber. The redirection device, operating with a consolidating and management device, processed upstream data packets. If the upstream data packet contained a URL page request from a subscriber for whom a bulletin service was pending, the URL page request was redirected to the bulletin server. The bulletin server incorporated the bulletin notification into the URL page requested by the subscriber.

In particular examples provided in the applications referenced above, subscribers of an ISP attempting access to an internet service were provided with notification of potential internet service issues. A further application of providing communications to subscribers includes notifying subscribers of potential virus infections and e-mail spamming such as disclosed in the Assignee's co-pending patent application, U.S. Ser. No. 12/004,634, the entire contents of which are explicitly incorporated herein by reference. A further application of providing communications to subscribers includes notifying subscribers of potential theft of internet service on an unsecured subscriber account, as described in the Assignee's co-pending patent application U.S. Ser. No. 12/004,635, the entire contents of which are explicitly incorporated herein by reference.

More recently, such as in the Assignee's co-pending patent application U.S. Ser. No. 12/340,863 the Assignee has suggested a modification to the redirection process in which the upstream data packets are mirrored or tapped to the redirection device so that the redirection device does not interfere with the upstream traffic and receives only a copy of relevant upstream packets, such as the URL page requests.

While the mirror redirection process provides a more efficient ISP service, problems can occur. Because the router mirrors or otherwise taps the upstream packet stream without affecting the upstream packets, a URL "GET" request will arrive at the intended destination server as well as causing a redirection to the alternative bulletin services server. There is therefore a possibility that a response from the real destination server will intermingle with the redirection response creating a conflict.

What is a required is a system and method that prevents conflicts between responses from alternative web servers.

SUMMARY OF THE INVENTION

In one aspect of the disclosure, there is provided a method for providing a notification service to a subscriber of an Internet Service Provider (ISP). The method comprises monitoring upstream traffic through the ISP from the subscriber and detecting a URL page request from the subscriber to a destination server. A redirection to the notification service is generated in response to detection of the URL page request and provided to the subscriber. The redirection comprises a single packet closing an active session between the subscriber and the destination server.

In one aspect of the disclosure, there is provided a method of redirecting a web page request from a subscriber comprising generating a single TCP packet comprising redirection data and a set FIN bit and providing the TCP packet to the subscriber.

In one aspect of the disclosure, there is provided an Internet Service Provider comprising a router and a redirection device. The router copies selected packets from a subscriber to the redirection device. The redirection device determines from copied packets whether a redirection is required, generates a redirection packet comprising redirection data and a set FIN bit, and provides the redirection packet to the subscriber.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
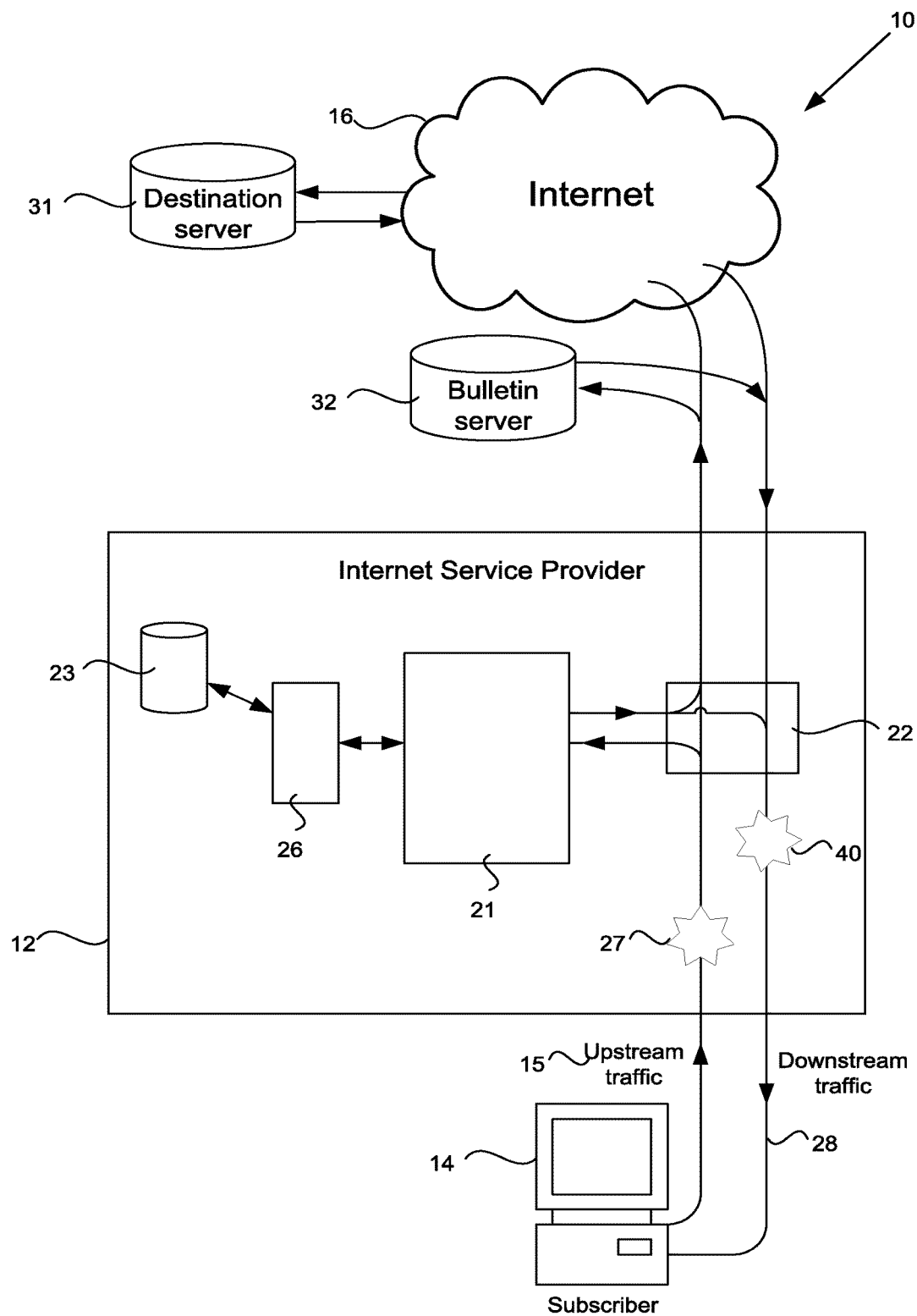
FIG. 1 schematically illustrates a network in accordance with an embodiment of the disclosure.

The present embodiments utilize many of the features and functionalities of the networks described in the Assignee's earlier patent applications referenced above, to which additional reference may be made. In FIG. 1, there is shown a system or network 10 in accordance with an embodiment of the disclosure. The network 10 includes an Internet Service Provider (ISP) 12 providing internet service between the internet 16 and a plurality of subscribers 14 via upstream 15 and downstream paths 28. For the sake of clarity, the subscriber device 14 is depicted as a personal computer, or PC. However, it will be readily understood by the person skilled in the art that the subscriber device 14 may be any internet enabled device such as a personal computer (PC), laptop, palm device, mobile telephone, gaming console and the like, and all such internet enabled devices are to be considered equivalent.

The ISP 12 includes a router or switch 22, a redirection device 21, a consolidating and management device 26 and an address provisioning database 23. The address provisioning database 23 stores associations between subscribers of the ISP and IP addresses allocated to the subscribers. The consolidating and management device 26 provides a query engine for accessing data from the database 23 in response to requests from the redirection device 21. The consolidating and management device 26 is operatively associated with the redirection device 21 to form a packet processing system, as will be described in greater detail below.

The router 22 provides a "mirror port" or "tap" on the upstream path 15 that detects selected upstream packets 27 and copies the selected packets to the redirection device 21 for further processing in addition to allowing the upstream packets 27 to pass to their intended destination. Downstream traffic from the internet 16, indicated by path 28 is routed by the router 22 to the intended subscriber 14.

Figure 2:
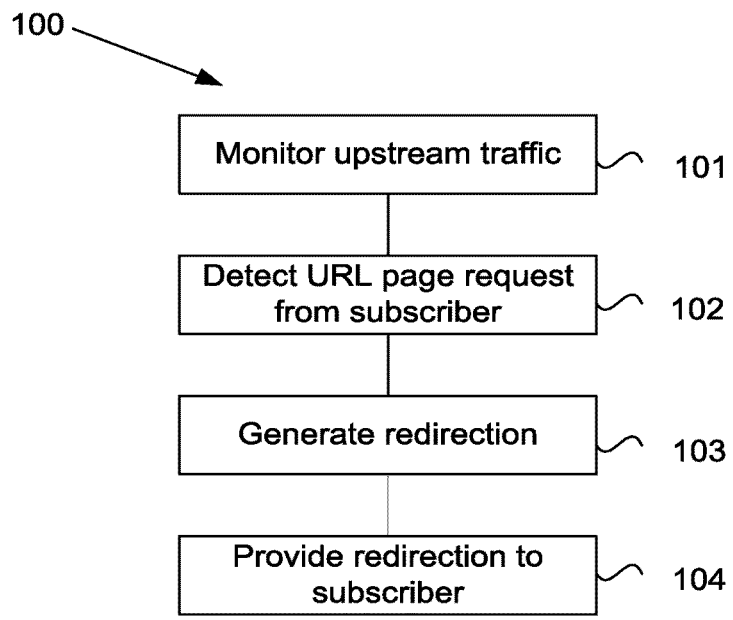
FIG. 2 represents a method for providing a notification service to a subscriber.

In the above referenced applications, certain upstream packets trigger redirections to alternative servers other than the intended destination server for providing a notification service. A method for providing a notification service in accordance with an embodiment of the disclosure is depicted in the flowchart 100 of FIG. 2. At step 101, the upstream traffic through the ISP is monitored and a URL page request is detected at step 102. If appropriate, a redirection to the notification service is generated at step 103 and provided to the subscriber at step 104. Further details of providing the redirection response are described below.

In one embodiment, the router 22 may detect upstream packets 27 that contain a web "GET" request to fetch a web page from a destination server 31. The router 22 copies, i.e. mirrors, these packets to the redirection device 21. The redirection device 21 processes the packet to determine a subscriber identity and then executes a query on the database 23 using the consolidation and management device 26 to determine whether a bulletin service is pending for the subscriber. If no bulletin service is pending, then the redirection device 21 performs no function and the subscriber fetches the intended web page from the destination server 31 in accordance with the GET request. If a bulletin service is pending, the redirection device injects a redirection response 40 into the downstream path 28 to the subscriber. The redirection response 40 redirects the subscriber to an alternative bulletin server 32 that is identified in the redirection packet. As described in the above referenced patent applications, the bulletin server 32 combines a bulletin service frame having a notification message together with the content of the web page originally requested by the subscriber. Other forms of providing the bulletin service have also been described, including pop-up windows and the like.

The term redirection device is used herein in order to provide consistency with the Applicant's earlier patent applications referenced above. The person skilled in the art will understand from the foregoing description that in the context of the present disclosure, the redirection device may not perform a strict redirection function in all embodiments. The term redirection may encompass many forms of redirection, including, but not limited to a redirection to an alternative server, a redirection away from the intended destination server, a straight HTTP redirect or a replacement page containing multiple HTTP, HTML, and/or scripting constructs (e.g., "<script src=. . . >") that essentially redirect the resulting visual rendering on the subscribers display.

In addition, a redirect may not be total, in that a GET request may cause a redirection as well as being transmitted through to the intended destination server. In addition, a redirection away from a destination server may still cause the intended page content to be retrieved from the destination server via a replacement page containing multiple "gets".

Figure 3:
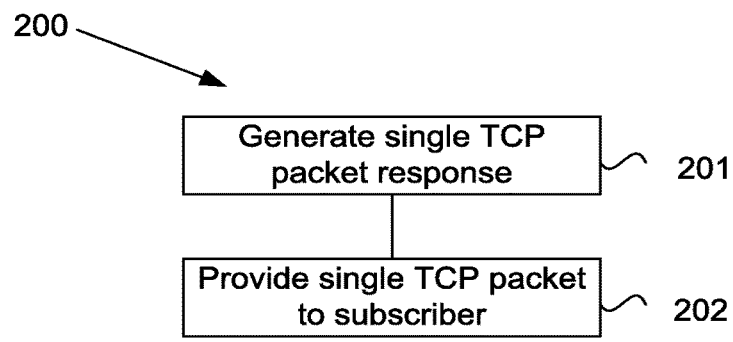
FIG. 3 represents a method for providing a single TCP packet redirection to a subscriber.

Because the router 22 mirrors the GET request to the redirection device 21, the original GET request may continue to the destination server 31 triggering a response from the destination server 31 to the subscriber 14. The destination server response may conflict with the redirection response 40. Therefore, in an embodiment of the disclosure depicted in the flowchart 200 of FIG. 3, a single TCP packet comprising redirection data and a set FIN bit is generated at step 201 and provided to the subscriber at step 202.

Figure 4:
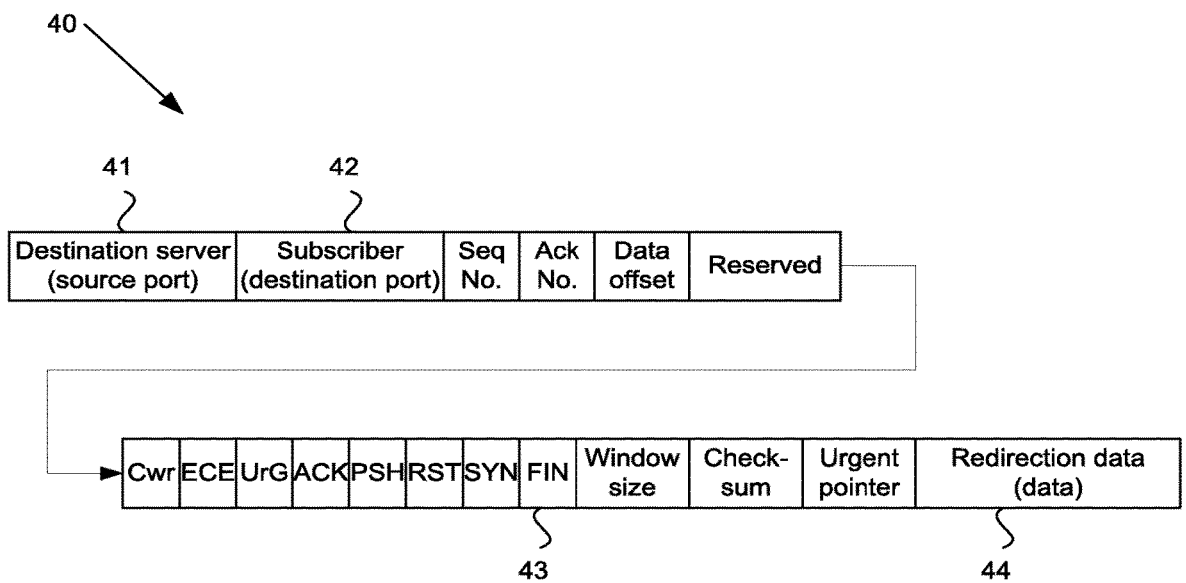
FIG. 4 illustrates an example of a single TCP packet redirection.

The redirection response 40 is depicted in FIG. 4. The redirection response 40 is generated as a single TCP packet that mimics a response from the destination server 31, for example, by identifying the destination server in the source port field 41 of the TCP header. The subscriber is identified in the destination field 42. The redirection packet 40 includes the data 44 that redirects the subscriber 14 to the bulletin server 32. Furthermore, in order to ensure that the subscriber 14 accepts the redirection packet 40 and does not accept packets from the destination server 31, the redirection packet 40 is created with the FIN bit 43 of the TCP header set. The set FIN bit 43 closes the active session with the destination server 31 and ensures that any packets returning from the destination server 31 will be rejected by the subscriber 14.

While the ISP 12 is conceptually shown in FIG. 1 as a single entity, a person skilled in the art will recognize that the components of the ISP may be provided in a distributed manner with suitable communication between components. For example, as described in the Assignee's referenced applications above, there can be a benefit if the router and/or the redirection device are placed at an edge of the network that represents the last scalable point in the operator's network, such as in the neighborhood along with a cable access concentrator. The consolidation and management device 26 and database 23 may be located elsewhere, such as at a network operations centre of the ISP 12. In addition, though the bulletin server 32 is shown outside of the ISP 12, in some embodiments, the bulletin server 32 may be a component of the ISP 12.

The process of generating and sending the single TCP packet response may be embodied in software and/or in hardware. For example, computer executable instructions may be stored on a computer readable medium that, when executed, cause the processor to perform one or more of the steps illustrated in the flowcharts of FIGS. 2 and 3. A processor may be operatively associated with a memory and provided in at least one of the redirection device and the consolidation and management device for executing the above described method steps.

Though a single database 23 is illustrated and described herein for clarity, the person skilled in the art will readily understand that the database 23 can be divided into a higher number of databases or may be consolidated with other databases. For example, the databases 23 may be consolidated with a database for storing an association between users and a subscriber account, as described in the Assignee's U.S. patent application Ser. No. 12/004,635, filed Dec. 24, 2007, titled "SYSTEM, METHOD AND COMPUTER READABLE MEDIUM FOR DETERMINING USERS OF AN INTERNET SERVICE", now U.S. Pat. No. 8,856,314, issued on Oct. 7, 2014, the entire contents of which are herein incorporated by reference. Alternatively or in addition, the database 23 may be consolidated with a database for storing an association between a subscriber and a shared secret as described in the Assignee's U.S. patent application Ser. No. 12/004,645, filed Dec. 24, 2007, titled "SYSTEM, METHOD AND COMPUTER READABLE MEDIUM FOR MESSAGE AUTHENTICATION TO SUBSCRIBERS OF AN INTERNET SERVICE PROVIDER", now U.S. Pat. No. 8,161,284, issued on Apr. 17, 2012, the entire contents of which are herein incorporated by reference.

Although embodiments of the present invention have been illustrated in the accompanying drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

The invention claimed is:

1. A method, comprising:
   determining, by a redirection device, that a bulletin service is pending for a subscriber based on a mirrored URL page request;
   generating, by the redirection device, a redirection response comprising a TCP packet that mimics a response from a destination server by identifying the destination server in a source port field of a TCP header of the TCP packet; and
   transmitting, by the redirection device, the TCP packet to the subscriber to redirect the subscriber from the destination server to the pending bulletin service and close an active session between the subscriber and the destination server, wherein the pending bulletin service comprises a frame with a notification message combined with content of a web page originally requested via the mirrored URL page request.

2. The method of claim 1, comprising:
   monitoring, by a routing device, upstream traffic from the subscriber.

3. The method of claim 1, wherein the mirrored URL page request is associated with a "GET" request.

4. The method of claim 1, wherein the TCP packet identifies a bulletin server as a redirection destination for the subscriber, wherein the bulletin server comprises an alternative web page server of an Internet Service Provider.

5. The method of claim 1, further comprising:
   processing the mirrored URL page request to determine a subscriber identity; and
   determining whether the notification message is pending for the subscriber identity.

6. The method of claim 1, wherein the method further comprises:
   closing the active session to ensure that any packets from the destination server are rejected by the subscriber.

7. The method of claim 1, wherein the TCP packet comprises:
   a FIN bit that prevents the subscriber from accepting other packets from the destination server by closing the active session.

8. The method of claim 1, further comprising:
   allowing the mirrored URL page request to pass to the destination server.

9. The method of claim 1, wherein the TCP packet closes the active session between the subscriber and the destination server.

10. The method of claim 1, further comprising:
    providing the bulletin service to the subscriber.

11. A system, comprising:
    a redirection device comprising a processor, wherein the redirection device is operatively associated with a memory and has access to at least one database,
    wherein the redirection device is further configured to:
    determine that a bulletin service is pending for a subscriber based on a mirrored web request,
    generate a redirection response comprising a TCP packet that mimics a response from a destination server by identifying the destination server in a source port field of a TCP header of the TCP packet; and
    transmit a TCP packet to the subscriber to redirect the subscriber from the destination server to the pending bulletin service and close an active session between the subscriber and the destination server, wherein the pending bulletin service comprises a frame with a notification message which is combined with content of a web page originally requested via the mirrored web request.

12. The system of claim 11, comprising:
    a router to monitor upstream traffic from the subscriber.

13. The system of claim 11, wherein the mirrored web request is associated with a "GET" request.

14. The system of claim 11, wherein the TCP packet comprises:
    an identification of the subscriber in a destination field of the TCP packet.

15. The system of claim 11, wherein the TCP packet comprises:
    a FIN bit that closes the active session.

16. The system of claim 11, comprising:
    a router that allows selected packets to pass through an Internet Service Provider to the destination server.

17. The system of claim 11, comprising:
    close the active session to ensure that any packets from the destination server are rejected by the subscriber.

18. The system of claim 11, comprising:
    allow the mirrored URL page request to pass to the destination server.

19. The system of claim 11, wherein the TCP packet closes the active session between the subscriber and the destination server.

20. The system of claim 11, comprising:
    provide the bulletin service to the subscriber.

* * * * *